Feb. 12, 1946.  W. C. WEBER  2,394,955
MACHINE FOR ASSEMBLING COMMUTATORS
Filed May 6, 1944  4 Sheets-Sheet 1

WALTER C. WEBER  INVENTOR.
BY Allen & Allen
Attorneys

Feb. 12, 1946. W. C. WEBER 2,394,955
MACHINE FOR ASSEMBLING COMMUTATORS
Filed May 6, 1944 4 Sheets-Sheet 2

WALTER C. WEBER INVENTOR.
BY Allen & Allen
Attorneys

Feb. 12, 1946. W. C. WEBER 2,394,955
MACHINE FOR ASSEMBLING COMMUTATORS
Filed May 6, 1944 4 Sheets-Sheet 3
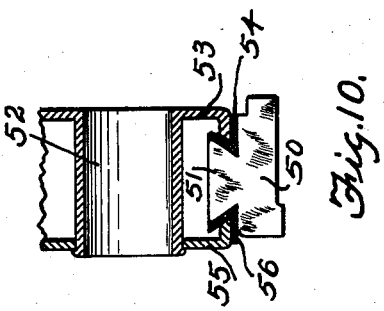
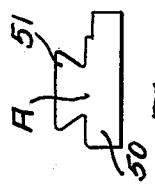
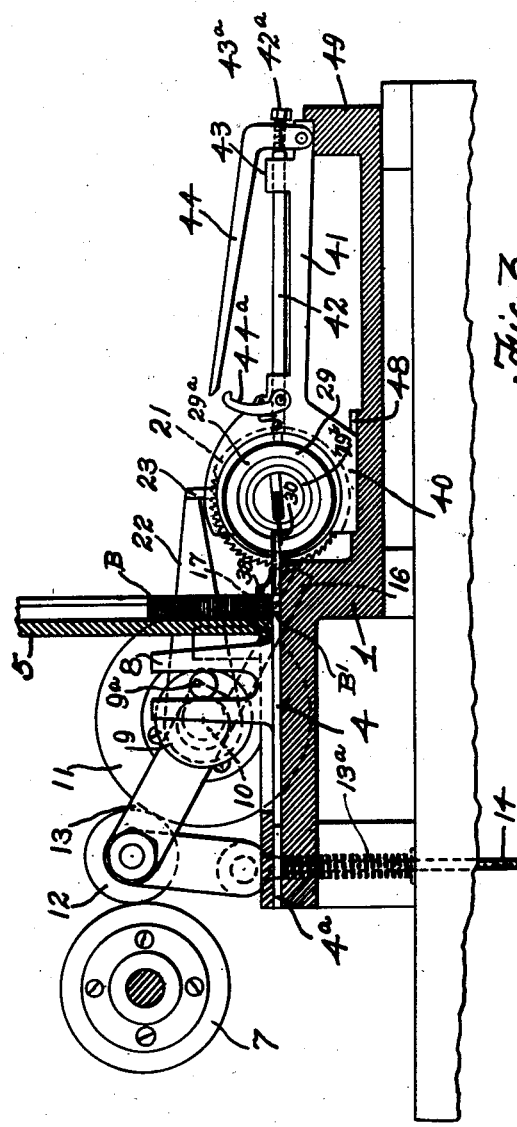
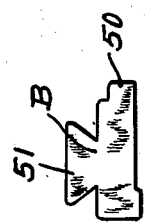
WALTER C. WEBER
INVENTOR.
BY Allen & Allen
Attorneys

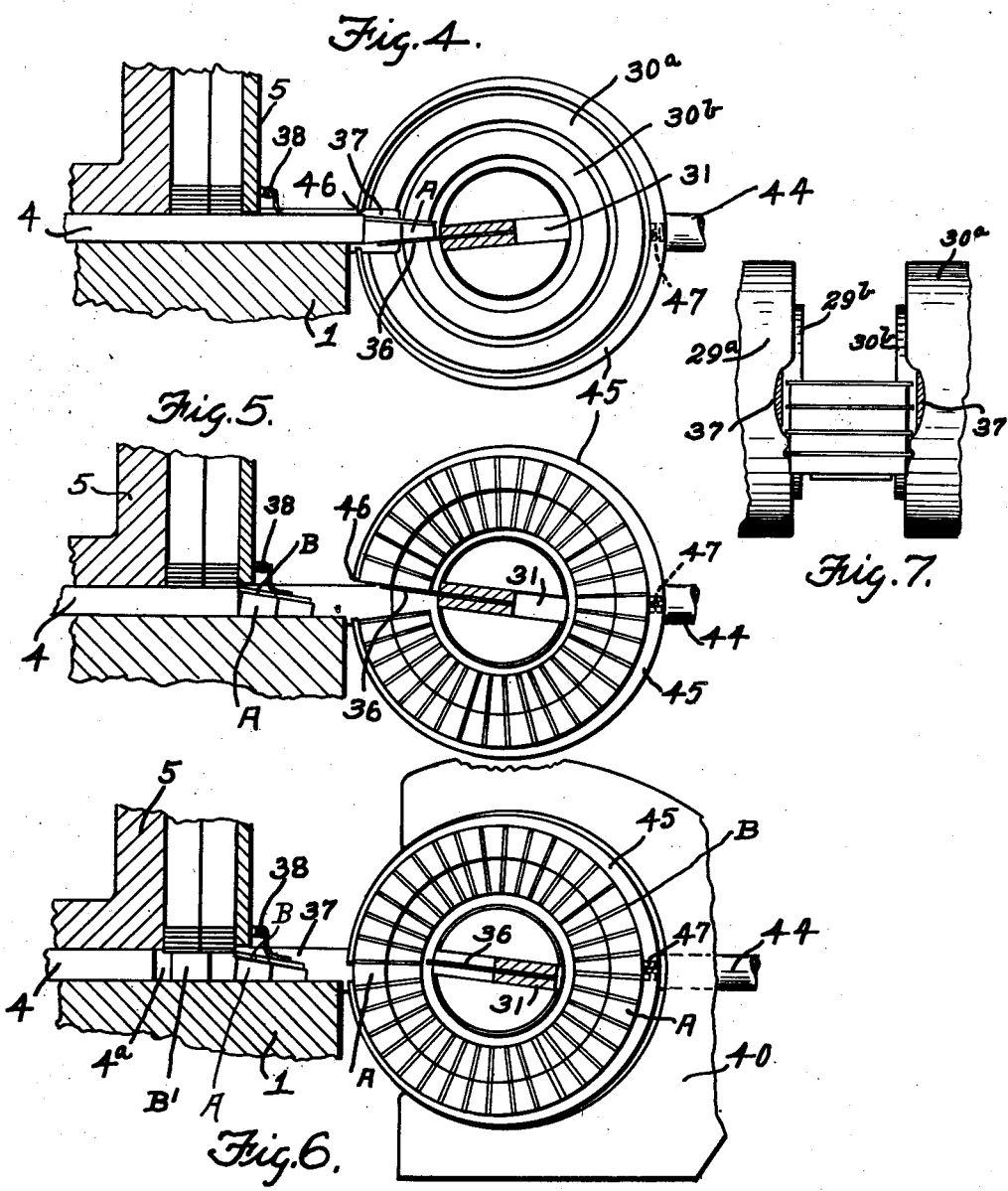

Patented Feb. 12, 1946

2,394,955

UNITED STATES PATENT OFFICE 2,394,955

MACHINE FOR ASSEMBLING COMMUTATORS

Walter C. Weber, Dayton, Ohio, assignor to Dayton Precision Manufacturing Company, a corporation of Delaware Application May 6, 1944, Serial No. 534,498

24 Claims. (Cl. 29—205)

This invention consists of a machine to automatically arrange individual segments in a position to form a complete circle.

An example of its use can be illustrated in the assembly of alternating copper and mica segments to form a commutator for electric motors.

Essentially the machine provides for automatically placing the individual segments in their proper radial position between two resilient faces which, when rotated, carry the segments around the inner periphery of a retaining clamp, to form a completed circle of segments, thus preparing the assembly to receive the hub members, which serve as the final holding means to complete the assembly.

At the present time, to the best of my knowledge, the operation of assembling commutator segments is performed by hand and represents a large portion of the labor expense in the manufacture of commutators.

In the hand assembly of commutators, a portion of the commutator hub is located inside a form of some kind. The individual copper bars are then placed by hand, in the available space around the hub, inside of the form, after which the individual mica segments are inserted between these copper bars, thus forming the complete circle of alternating copper and mica segments. At this time, the balance of the hub is placed in position and the assembly passed on for further operations.

From this it is obvious that the provision of an automatic machine for accomplishing such an assembly is a substantial improvement.

In the drawings I illustrate in a simple form, an illustrative example of the invention, it being understood that according to the invention, certain of the illustrated manual operations may be replaced by ones which are mechanized so as to be automatic. The invention inherent in said example will be set forth in the appended claims.

Figure 3 is a vertical section on the line 3—3 of Figure 2.

Figures 4, 5 and 6 are like views illustrating three stages in the operation, being a detail of the assembling zone of the machine.

Figure 7 is a detail of the assembling zone illustrating the operation of the compression fingers.

Figures 8 and 9 are plan views of the segments of mica and copper respectively.

Figure 10 is a detail illustrating final assembly of the commutator.

Figure 1:
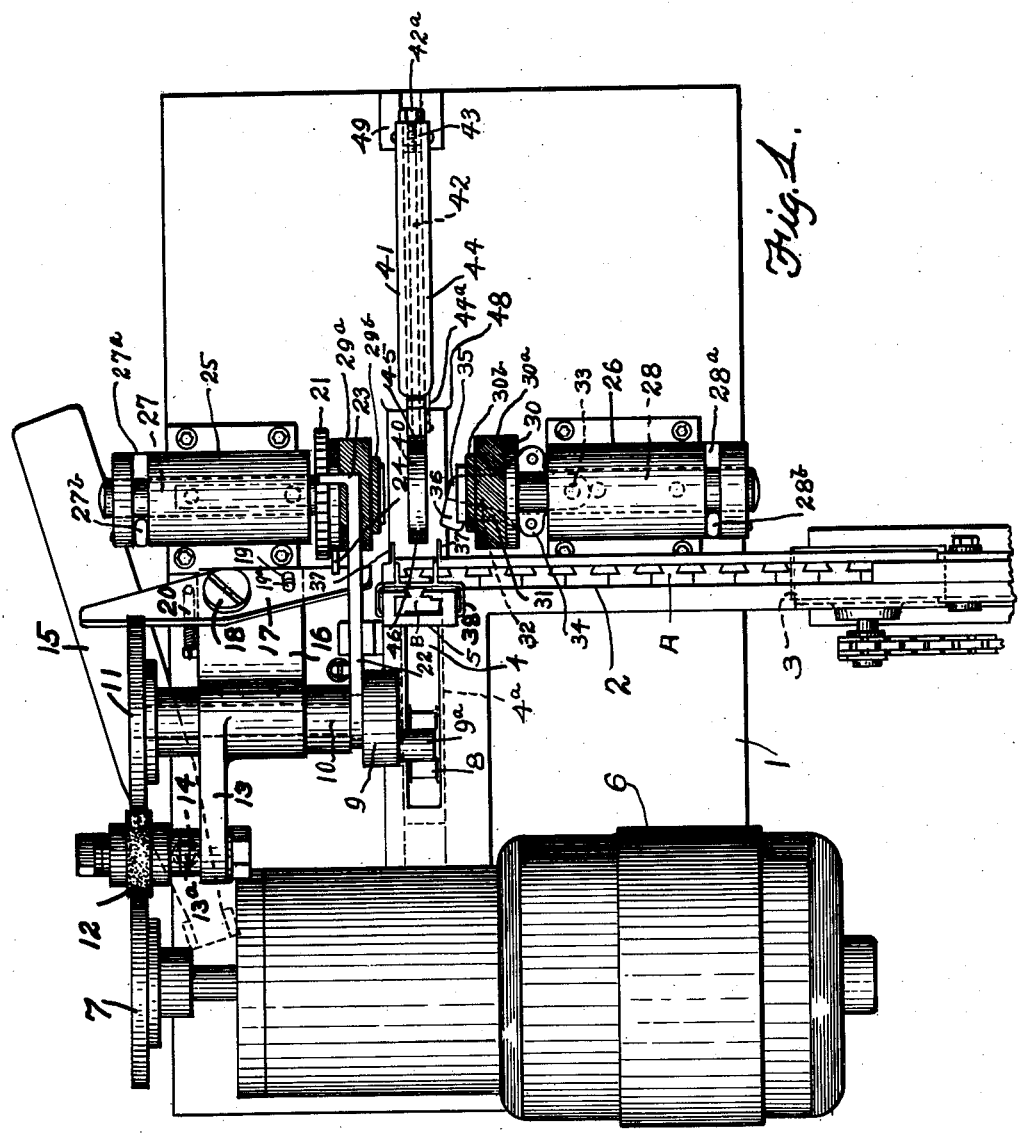
Figure 1 is a plan view of the exemplary machine shown in open position ready to begin an operation.

The bed of the machine is indicated at 1, and on the bed is shown a channel portion 2 through which a series of commutator segments or copper bars A are being advanced in any desired manner, as by a friction belt indicated at 3. There is another channel portion 4a in the bed which intersects the channel portion 2, in which channel portion 4a, a pusher bar 4 is caused to reciprocate. There is a vertical housing 5 which is mounted slightly inwardly from the intersection of the two channels in which mica segments B are arranged, and which feed down by gravity onto supporting ledges B1, between which the pusher moves and that are below the top of the pusher, so that the pusher will when advanced in its channel, push a mica bar away from beneath the housing 5, onto the top of a copper bar and then the pair out through the end of the channel portion 4. The end of the channel 4 is as wide as the segments are long, but the pusher and the rest of the channel is not so wide.

The drive for the apparatus is from a motor 6, which, in the present example drives a friction wheel 7. The pusher bar has a yoke 8 thereon which is engaged by an eccentric stud 9a on a wheel 9, held in the end of a shaft 10. The shaft 10 has a friction wheel 11 thereon, and to clutch the shaft 10 to the motor, I employ an idler friction wheel 12. This wheel is held on a rocker 13, pivoted on the shaft 10. There is a rod 14 from the rocker arm 13 to a foot treadle 15. If desired, the rod may be surrounded near its upper end by a spring 13a which has a bearing on frame 1, the spring acting to release the idler friction wheel 12 when the foot treadle is released. Also the rocker 13 has a plate portion 16 on the far side of the shaft 10, on which is an abutment finger 17. This finger is held in position on the hanger by a suitable pivot stud 18, and has a slot 19 in it which rides over a stop pin 19a, thus permitting the finger to swing on its pivot. A spring 20 serves to hold the finger in normal position with the stop pin in the rear of the slot. The reason for this motion for the finger is to permit the clearing of an operating abutment, which will be noted below. When the finger is pushed down, the hanger is rocked so as to shift the idler friction wheel up and away from contact with the friction wheels 7 and 11. This pushing down of the finger is automatically accomplished after a timed series of operations of the pusher bar.

Thus the assembly holder device, to be described below is actuated by a ratchet wheel 21 on one of its members. A pawl lever 22, which is eccentrically held on the same shaft 10 that carries the eccentric stud for the pusher bar. The end 23 of the pawl lever thus engages the ratchet and when the pusher bar moves forward, advances over one ratchet tooth space, and as the pusher bar is retracted engages and moves the ratchet wheel one tooth space. The operation indexes the pusher operations with the rotation of the assembly holder structure.

An abutment pin 24 on the ratchet wheel is located so as to engage the abutment finger 17, thus when the assembly holder device has been rotated through a series of steps governed by the number of teeth in the ratchet wheel, the abutment pin will depress the finger, and stop the operation of the shaft 10, and hence the assembly operation, until the parts are ready for the next operation.

Referring now to the assembly holder, the bed of the machine is provided with two sleeves or bearings 25 and 26. In each of these bearings respectively are shafts 27 and 28, which can slide and rotate in the sleeves. In order to move the shafts apart from each other and hold them in co-operating position toward each other, the sleeves are equipped with slotted portions 27a, 28a, near their outer ends, and stop fingers 27b, 28b, are pivoted at these slotted portions. By raising the stop fingers the shafts can be pushed outwardly, but when pushed inwardly and toward each other, the shafts are held in position by dropping the stop fingers into the slots which results in placing an abutment against the ends of the two shafts.

The shaft 27 has the operating ratchet wheel 21 thereon, and located near the inner or active end of this shaft is a circular rubber gripper member disk 29. The gripper disk mounts a rubber member, and the shape of this rubber member is such as to accommodate the particular shape of commutator segment that is to be used. In the present instances it is of solid rubber fitting tightly on the shaft and having two concentric rings projecting from its face, the outer ring 29a being of less depth than the inner one 29b. A like rubber gripper, as will be noted, is mounted on the other of the two shafts.

The inner or active end of the shaft 27 is slotted to engage a tongue on the other shaft 28.

The other shaft 28 is equipped with a gripper disk 30, mounting a rubber member with outer ring 30a, and inner ring 30b, just like the other rubber member. The shaft 28 has a longitudinal slot in its end as indicated at 31, and in this slotted end is a pivoted tongue 32, the pivot being at 33 in the inner end of the slot. There are two lateral protuberances at 34 on the tongue whereby it can be manipulated, if necessary. The active end of the tongue projects as at 35 from the head end of the shaft 28, where it serves as the tongue to engage the slot in the end of the shaft 27. The tongue also carries a small platform plate 36, which is an important element of the invention, since the platform serves at the start of the assembling operation to hold the first segments ejected by the pusher bar. When properly indexed the platform is just below the channel of the pusher.

Secured at the sides of the exposed end of the pusher bar slot are two compression fingers 37, 37, which project into the space occupied by the rubber portions 29a and 30a, and depresses the rubber in a fashion indicated in the detail in Fig. 7. The reason for arranging for a limited rocking of the tongue 32 is to permit clearing of the fingers 37, should this be necessary.

In addition to the parts now described, the machine may have devices to keep the segments of copper and mica in position as they are advanced by the pusher bar, such as a bail 38 (Fig. 1), which is pivoted along side of the mica hopper near the bottom thereof, and has two fingers which fall by gravity to a position of resting on top of the mica segment as the copper and mica segments are advanced by the pusher.

The tool (in this case a hand tool), which is used to hold the assembly of segments, has a semicircular head 40, (Fig. 3), a bar portion or handle 41, and a reciprocating rod 42 held in a bearing 43 near the rear of the handle and passing through the head 40 at its horizontal axis. The rod abuts at its outer end with a stud 42 held in a clevis 43a pivoted at the end of the handle, which clevis is integral with an operating lever 44. By depressing the lever toward the tool handle, the rod is thrust forwardly. At this position the lever may be latched down by a spring finger 44a. When the handle is raised or permitted to be loose, the spring which engages the spring finger will push, causing it to lie beneath the end of the lever, and hold it there with the rod somewhat retracted.

Located inside of the semicircular head, somewhat loosely, is an assembly ring 45, which is a resilient split ring having a split 46 located at a position which when the tool is in place, will be just above the position assumed by the platform plate 36. The ring has a hole on its inner horizontal axis which engages a reduced end 47 of the rod 42. This reduced end holds the split ring or assembly ring in position and can be removed from the ring by swinging the operating lever 43 upwardly. When, however, the operating lever is pushed down to latched position, the thicker portion of the rod 42 presses on the assembly ring and pushes it forwardly within the semicircular head. This, due to the shape of the head, tends to contract the ring, making its inner diameter smaller, and as will be noted, this clamps the assembled segments together for removal of the tool from the machine.

The machine bed is equipped with a support 48 into a channel of which the head of the tool is thrust and a supporting post 49, which is slotted to engage the outer end of the tool handle. This arrangement is such that when the tool is placed in the machine it is located at a definite position, directly between the two rubber faced heads on the sliding shafts of the assembly device.

As so constructed the operations are as follows: the tool is set in place in the machine with the split ring in position with its opening facing the end of the channel in which the pusher is located, so that the segments can be thrust through this opening to the inside of the ring. The two shafts 27 and 28 properly indexed are thrust toward each other until the ends engage with the platform plate projecting from the tongue portion on the shaft 28 so as to be just within and just below the opening in the ring. The operator then operates the abutment finger 17 so that it moves out from under the abutment pin 24 on the operating ratchet on the shaft 27. The pawl which operates this ratchet has a long enough engaging face to permit this sliding of the shaft 27 without ruining its indexed position.

The operator then depresses the foot pedal and starts up the operation. The pusher moves forward and ejects a copper segment and a mica segment on top of it, which move out between the two compression fingers, through the opening in the assembly ring and into a position on the small platform. The shape of the segments as shown in Figures 8 and 9, the former being the mica and the latter the copper, is substantially the same, except that the mica is slightly larger, and has a projecting lip. The copper bars are usually wedge shaped in cross section so as to assemble together snugly throughout. The segments include a main portion 50 and a dovetail 51. The path for their movement between the concentric rubber rings is kept clear by the compression fingers 37, and they move inwardly until their dovetail edges come to the adjoining heads of the two shafts. The pusher moves far enough forward to push the rear edges of the segments past the body of the assembly ring and withdraws, leaving the segments seated on the platform plate.

The pawl then gives the ratchet one tooth turn, and the pusher advances again laying a new pair of segments on top of the former ones. Upon the next retraction of the pusher and advance of the ratchet, the rubber of the two rings is freed from the compression fingers and thus grips the end edges of the segments and holds them in place. They can and do however, move around with the rubber grippers inside of the assembly ring, following pairs of segments being pushed out onto the top of the preceding pair, at each operation of the pusher and ratchet.

The final copper and mica segment pair is thrust into position beneath the platform plate, and then the abutment pin on the ratchet operates to depress the abutment finger, rock the hanger on which it is located and remove the idler friction disk from operative position. The machine then stops operating. The operator swings up the gate plates 27b, 28b, at the ends of the two sleeves in which the shafts 27 and 28 are located and manually pushes these shafts away from each other by merely grasping the rubber faced heads and pushing them apart.

Either before or after this, the lever on the tool that is holding the assembly ring in place is thrust down to latched position. This grips the ring about the assembled segments and holds them while the operator lifts the assembly along with the tool out of the machine. Thereupon to complete the assembly, the operator may use a small stamping press and while doing so may insert another tool in the machine and start it up again. On a post on the bed of this press is placed a portion of the hub of the commutator, which is indicated at 52, with the flange 53 thereof covered with a channeled ring 54 of insulation. The assembly is dropped over this hub, with the dovetail portions entering the insulated flange of the hub head. A matching head 55 is then equipped with a channel shaped ring of insulation 56, thrust over the hub 52, and brought down to engage the over dovetail of the assembly, whereupon the press swedges the hub about this matching head, thus forming the complete assembly. The assembled commutator is then tapped out of the tool, and the tool replaced in the machine for a second operation, as above described.

The principle of the machine, as now described, can be applied in many ways which we have not illustrated, since it has been the desire to describe the simplest form and the best form thereof now finished and in operation making commutators. The mode of presenting the rubber faced elements to the assembly ring, whether done automatically in timed sequence with a turret for presenting assembly rings, or whether done in some other fashion with hand manipulation, can be varied without departing from the novelty inherent in the present invention. The drive shown is but one form which has been used with the machine.

The machine shown has, however, aside from the essential novel principles, a very effective and inexpensive construction capable of assembling commutators with great accuracy and with the attention of a single attendant. The machine can be set up in connection with a machine for making the copper segments, and in another application for patent, I will describe a simple mode whereby the stamping press for the segments can be timed with pawl and eccentric not described, to keep up a supply of copper bars.

The fact that the assembly is in the form of an arch as it grows within the assembly ring on the rubber faced heads, helps to keep the segments from falling away from each other or becoming dislodged, and the indexing together with the use of the compression fingers assures a gravity deposition of each pair of segments in surface contact with the preceding pair during the cycle of operation. Where the mica segments are larger than the copper segments, they hold the copper segments in place even if the rubber does not so positively engage the copper segments, and it is quite true in the present apparatus that each successive piece need not be independently gripped, while each alternative piece is independently gripped.

Figure 2:
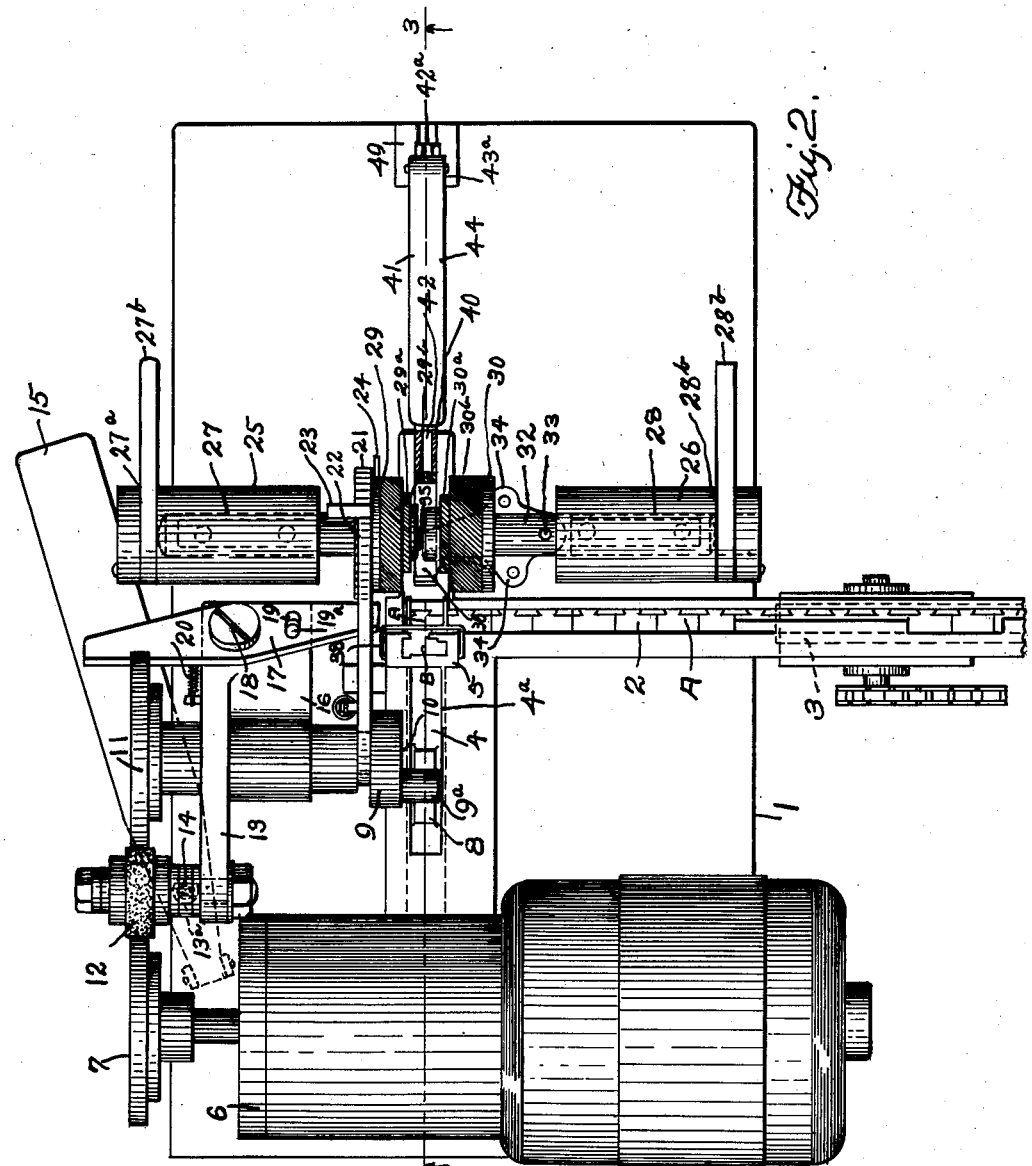
Figure 2 is a like view showing the parts in operating position.

The drawings, Figures 4, 5 and 6, show in Figure 4, the beginning of an operation with the first pair of segments pushed into place on the platform. In Figure 5 the last pair of segments is about to be thrust into place. In Figure 6 the assembly is complete, and the assembly ring has been compressed to hold it. The platform plate has also been withdrawn laterally from the assembly, which is accomplished by rocking of the tongue on which the platform is located, as has been described. In doing this the operator merely thrusts a finger behind the head of the shaft 28 and pushes on the left hand projection on the tongue just behind the head of the shaft. Figure 1 shows the two shafts and their heads withdrawn from each other, and Figure 2 shows them thrust together.

Instead of rubber facing, it is considered that the retaining heads might be made resilient in some other way and provided with a gripping surface with respect to which the segments will not slide although in such a construction the compression fingers would not be so effective.

Having thus described my invention, what I claim as new and desire to secure by Letters Patent is:

1. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion.

2. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion, and a platform plate located radially of the space between the heads and moving with the heads, arranged to support an initial segmental piece.

3. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion, and a platform plate located radially of the space between the heads and moving with the heads, arranged to support an initial segmental piece, said platform plate being mounted on one of said heads.

4. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion, and a platform plate located radially of the space between the heads and moving with the heads, arranged to support an initial segmental piece, said platform plate being mounted on one of said heads, said means for rotating said heads in step by step motion comprising an axial connection between the heads, and a ratchet on one of said heads.

5. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion, and a platform plate located radially of the space between the heads and moving with the heads, arranged to support an initial segmental piece, said means for inserting segmental pieces comprising a pusher, and endwise guides for the segmental pieces holding the faces of the heads compressed at the point of insertion of the segments.

6. In combination a pair of slidably and rotatably mounted heads situated in spaced relation, the opposed faces of which are resilient and compressible, means for driving said two heads as a unit, and means whereby the heads are moved axially with relation to each other, said driving means moving said heads in a step by step rotary motion, and means for inserting segmental pieces radially of the space between said heads timed with the step by step motion, an assembly ring located between the two heads when same are in operating position, said ring having an opening for insertion of the segments to the inside of the ring.

7. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring.

8. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, said ring being of contractible construction and hence compressible about the assembly when it is completed.

9. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and a platform element between the rotary members movable therewith, and located, at initial assembling position, just below the zone of insertion of the segments within the ring.

10. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and means for rotating said rotary members step by step, and means actuated upon completion of a given number of steps for stopping said means.

11. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and means for rotating said rotary members step by step, and means actuated upon completion of a given number of steps for stopping said means, said several means comprising a pawl and ratchet and a stop controlled by the ratchet.

12. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, means for insertion of segments into the ring, and power means for the insertion means connected for operation in alternate steps with the rotary members.

13. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, said gripping surfaces being composed of resilient and compressible material.

14. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, said gripping surfaces being composed of resilient and compressible material, and means for holding said surfaces compressed at the point of insertion of the segments.

15. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, operating means for rotating said rotary members step by step, and means arranged upon completion of a given number of steps for stopping said means, an inserting device arranged to insert said segments into the ring, and power means for the insertion means connected for operation in alternate steps with the rotary members.

16. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and means for mounting the rotary members for movement to and from the sides of the ring to permit insertion and removal of said ring.

17. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and a platform element between the rotary members movable therewith, and located, at initial assembling position, just below the zone of insertion of the segments within the ring, and means for rotating said rotary members step by step, and means actuated upon completion of a given number of steps for stopping said means.

18. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, and a platform element between the rotary members movable therewith, and located, at initial assembling position, just below the zone of insertion of the segments within the ring, and means for rotating said rotary members step by step, and means actuated upon completion of a given number of steps for stopping said means, said several means comprising a pawl and ratchet and a stop controlled by the ratchet.

19. In combination an assembly ring within which segments are to be assembled, said ring having a lateral opening for insertion of the segments, and a rotary member operating at each side of the ring, each rotary member lying parallel to the plane of the ring, and presenting opposed gripping surfaces for engaging and holding the segments when inserted in the ring, said gripping surfaces comprising concentric rings of soft rubber.

20. A tool for receiving and retaining an annulus of segmental pieces comprising a head having a circular cavity with a radial opening at one portion, a split ring normally of the approximate size of said cavity and held in said cavity with its split in the zone of the opening, and means for moving the ring transversely of its axis, whereby the cavity wall acts to compress the ring.

21. A tool for receiving and retaining an annulus of segmental pieces comprising a head having a circular cavity with a radial opening at one portion, a split ring normally of the approximate size of said cavity and held in said cavity with its split in the zone of the opening, and means for moving the ring transversely of its axis, whereby the cavity wall acts to compress the ring, and means on said tool cooperative with means on a machine in which it is to be used, for locating it in a definite position in the machine without impeding its ready removability.

22. A tool for receiving and retaining an annulus of segmental pieces comprising a head having a circular cavity with a radial opening at one portion, a split ring normally of the approximate size of said cavity and held in said cavity with its split in the zone of the opening, and means for moving the ring transversely of its axis, whereby the cavity wall acts to compress the ring, the means for moving the ring comprising a rod slidable in the head and means on the rod fixedly to engage the ring.

23. A machine for assembling commutator bars and interspaced insulation strips, comprising means for moving bars each with a superimposed strip thereon, individually and flatwise, from a supply through an opening in a ring, a split ring of which the split constitutes said opening, rotary means arranged to engaged the ends of the bars as they are inserted and move them around the interior of the ring, said rotary means including a platform movable to and from a position radial to the inner periphery of the ring so as to support when moved to said position the initial bar inserted into the ring and move with it, and means for compressing the said ring, whereby upon completion of an annulus of bars and strips within the ring, the platform may be withdrawn therefrom but the annulus held in the ring by virtue of its compression.

24. A machine for assembling commutator bars and interspaced insulation strips, comprising means for moving bars each with a superimposed strip thereon, individually and flatwise, from a supply through an opening in a ring, a split ring of which the split constitutes said opening, rotary means arranged to engage the ends of the bars as they are inserted and move them around the interior of the ring, said rotary means including a platform movable to and from a position radial to the inner periphery of the ring so as to support when moved to said position the initial bar inserted into the ring and move with it, and means for compressing the said ring, whereby upon completion of an annulus of bars and strips within the ring, the platform may be withdrawn therefrom but the annulus held in the ring by virtue of its compression, a tool having means for locating it removably in said machine, the ring being mounted in said tool and said compressing means being mounted in said tool.

WALTER C. WEBER.